United States Patent [19]

Beasley et al.

[11] 3,945,811
[45] Mar. 23, 1976

[54] PROCESS FOR REMOVING SULFUR COMPOUNDS FROM GASES

[75] Inventors: Glenn H. Beasley, Cheltenham; Peter G. Cartier, Cornwells Heights, both of Pa.

[73] Assignee: Rohm and Haas Company, Philadelphia, Pa.

[22] Filed: Dec. 19, 1974

[21] Appl. No.: 534,385

Related U.S. Application Data

[63] Continuation-in-part of Ser. No. 512,815, Oct. 7, 1974, abandoned.

[52] U.S. Cl. .......................... 55/73; 210/74; 210/76
[51] Int. Cl.² ......................................... B01D 53/02
[58] Field of Search .......... 55/73, 74, 76; 260/2.1 R

[56] References Cited

UNITED STATES PATENTS

| | | | |
|---|---|---|---|
| 3,780,500 | 12/1973 | Clemens | 55/74 X |
| 3,816,355 | 6/1974 | Clemens | 260/2.1 R |

*Primary Examiner*—John Adee

[57] ABSTRACT

Sulfur dioxide and sulfur trioxide may be removed from gases over a broad range of temperature and moisture conditions by utilizing a class of resinous adsorbents which retain their capacity at low moisture levels. Preferred embodiments are those resins which may be thermally regenerated to recover the sulfur.

18 Claims, No Drawings

PROCESS FOR REMOVING SULFUR COMPOUNDS FROM GASES

This is a continuation-in-part application of copending U.S. application Ser. No. 512,815, filed Oct. 7, 1974, now abandoned.

BACKGROUND OF THE INVENTION

This invention concerns a process for the removal and optional recovery of sulfur oxides from gaseous streams using a solid resin adsorbent. More particularly the invention concerns the treatment of waste streams such as stack gases discharged from generating plants, industrial plants which produce sulfur derivatives and other facilities that burn sulfur-containing coal or oil.

As a result of the enactment of the recent Federal Clean Air Act and corresponding state legislation designed to provide for the implementation of standards approved by the Federal Environmental Protection Agency, a major portion of the fossil-fueled power plants in the U.S. are under order to reduce their output of sulfur dioxide substantially in the near future. Some of these emission standards may be attained by the use of low sulfur fuels, but sufficient supplies of such fuels for all generating units will not be available for many years.

At present no acceptable method to adsorb sulfur oxides from hot gaseous streams appears known which would comply with today's stringent environmental standards. The art does disclose a wet scrubbing process which provides for the gaseous stream to be contacted with lime/limestone slurries to form insoluble calcium solids. Unfortunately no practical method has been developed for the disposal of this quicksand-like sludge. Furthermore the disposal of these wastes has caused concern to environmentalists.

The prior art further contains various suggestions for removing sulfur dioxide from gases utilizing resins. See, for example, U.S. Pat. Nos. 3,709,977; 3,727,379 and French Pat. No. 1,356,116. None of these resins however perform satisfactorily over broad ranges of temperatures and resin moisture conditions. They are particularly deficient in the case of stack gas purification.

The inadequacy of the prior art resins has been theorized to be related to the marked decrease in capacity such resins experience at low moisture levels. When a wet solid adsorbent is contacted with, for example, a hot stack gas, a substantial drying of the adsorbent takes place despite the presence of moisture in the gas. Such dehydration renders many resins ineffective particularly if the moisture content falls much below the 50% mark. Consequently the utilization of such resins requires the cooling of such stack gases usually to temperatures circa 50°C. to avoid dehydration of the resinous adsorbents and followed by significant reheating of the gases to provide buoyancy for the gases to escape from tall stacks.

It is a primary object of the present invention to provide a process for removing sulfur oxides over a broad range of temperature and moisture conditions.

It is additionally an object of the present invention to prevent air pollution due to sulfur dioxide emission.

It is a further object of the present invention to provide a process which will allow industrial sulfur dioxide emissions to meet governmental standards.

Another object is to provide a sulfur oxide recovery process which will produce saleable sulfur products including, for example, elemental sulfur, sulfuric acid, sulfur dioxide, sodium sulfate and sodium bisulfate.

A further object of the invention is to provide a method of recovery of sulfur oxides from stack gases.

These and other objects are achieved by the present invention set forth now in greater detail.

SUMMARY OF THE INVENTION

According to the present invention there is provided a process for separating sulfur oxides from gases which comprises contacting said gases with a crosslinked macroreticular resin comprising a functional moiety containing at least one basic nitrogen and at least one acid metal salt group.

Preferred polymeric backbones include styrene, vinyl benzylchloride, ethylene, acrolein, acrylonitrile, methylvinyl ketone, acrylates or methacrylates which are crosslinked with such monomers as divinylbenzene, trimethylolpropane trimethacrylate, ethyleneglycol dimethacrylate or ethylene glycol divinylether. Preferred functional groups include amino acids and iminodiacids of carboxylic, phosphonic or sulfonic acids. More preferred are those amino and iminodiacids which contain carboxylic acids. Specifically, resins having the iminodiacetic, aminoacetic and picolinic acid moieties function best.

Suitable resins include those having the following formulas or tautomers thereof:

I 

where $R_1$ is

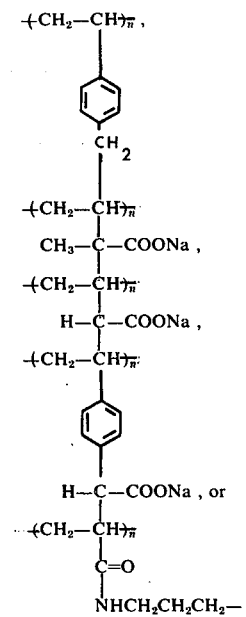

and where at least one of $R_1$, $R_2$ and $R_3$ is an acid metal salt and both $R_2$ and $R_3$ are selected from $CH_2COONa$,

$CH_2SO_3Na$, $CH_2CH_2COONa$, H, and any alkyl group;

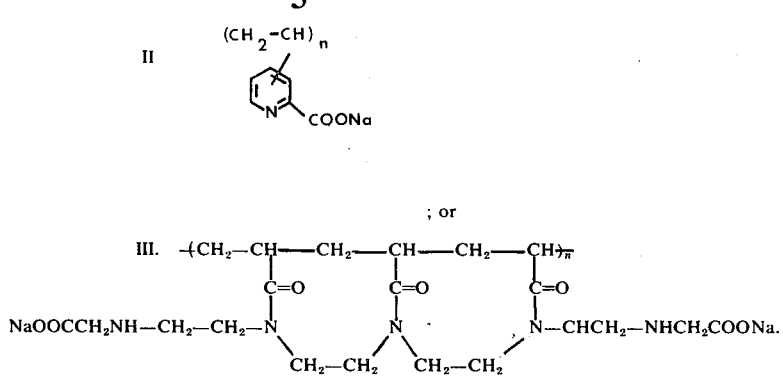

; or

III. $-\text{(CH}_2-\text{CH}-\text{CH}_2-\text{CH}-\text{CH}_2-\text{CH})_n-$
with $C=O$ groups and $\text{NaOOCCH}_2\text{NH}-\text{CH}_2-\text{CH}_2-\text{N}\langle\text{CH}_2-\text{CH}_2\rangle\text{N}\langle\text{CH}_2-\text{CH}_2\rangle\text{N}-\text{CHCH}_2-\text{NHCH}_2\text{COONa}$.

The resins may include additional functional groups such as ketones, amides, esters, ethers or nitriles without affecting their efficacy.

Although the process may be in the form of a fixed bed system, a preferred embodiment of the process would comprise having the stack gas at temperatures ranging from 50° to 100°C., being contacted with an adsorbent in a staged, semi-continuous fluidized system. A typical stack gas may contain up to 3000 ppm of $SO_2$ and is preferably contacted with an electrostatic precipitator or water scrubber to remove particulate content. Frequently a water scrubber will find use as a pre-treatment step to remove particulates, $SO_3$ and $NO_2$.

Since the capacity of the resins so useful in the process of the invention is maintained they frequently remove more than 96% of the sulfur dioxide emission, resulting in a treated gas which usually contains less then 200 ppm of $SO_2$, a level which is well within the present Federal regulations.

Preferred resins of the invention are thermally regenerable. Such a regeneration may be accomplished by subjecting the $SO_2$ loaded resin bed to steam at temperatures above 100° C., thereby stripping the $SO_2$ from the resin. Due to oxidation however a portion of the $SO_2$ adsorbed on the resin is difficult to recover by thermal elution. It is therefore necessary occasionally to include a chemical regeneration such as for example a water rinse followed by caustic to remove the nonelutable sulphur compounds as sodium salts. The caustic also converts the resin to its active form.

The invention will now be described further with reference to the following specific examples which are merely illustrative.

As mentioned hereinbefore, preferred systems would of course include a continuous fluidized bed containing a closed resin loop. An example of such a system is given below.

In a single-stage, fluid bed adsorber, a macroreticular styrene/3.5% divinyl benzene/4% trimethylolpropane trimethacrylate resin containing 2.7 millimoles of iminodiacetic acid/gram dry in the sodium form is fluidized at 70°C. with a simulated stack gas stream containing 2000 ppm $SO_2$, 12% $H_2O$, 5% $O_2$, and 10 ppm $NO_2$ at a superficial gas velocity of 1.7 ft./sec. (370 lb./hr. ft.²). The resin is loaded with $SO_2$ until an instantaneous $SO_2$ concentration in the effluent gas of about 1000 ppm is detected (80% total $SO_2$ removal). The resin is then thermally eluted with steam at about 130°C. for 20 minutes. Finally, the resin is cooled to 70°C. and a subsequent loading cycle is begun. After 11 load-steam elute cycles, the resin is rinsed with water eluting sodium salts of non-elutable sulphur compounds followed by regeneration with caustic to put the resin in its active form - the sodium form. The resin has the following properties: surface area of about 37 sq. meters per gram; pore size range of about 400 to about 1200 Angstrom units; pore volume or porosity of about 0.66 cc./gram or 0.47 cc./cc. — all properties measured in the dry $H^+$ form.

Experimental results for the above 11 cycle study indicate an average resin capacity of 0.026 lb. $SO_2$ sorbed/lb. dry resin and an average thermal elution of 79% of the $SO_2$ sorbed.

Various other resins were evaluated in fluid or a fixed bed system. All resins evaluated in the process of the invention are listed and identified in the following Table I.

EXAMPLE 1

A 9.562 solvent treated and dried sample of Resin A is placed in a 1 inch diameter, jacketed stainless steel column. The resin is exposed to a simulated stack gas stream containing 2100 ppm $SO_2$, 3% $O_2$, and 11% $H_2O$ passed upflow through the resin column at a temperature of 70°C. and 10,000 ml./min. At this high gas velocity (1.7 ft./sec.), the resin bed is fluidized with 100% expansion vs. the fixed bed volume. The resin is thermally eluted with superheated steam passed upflow through the resin column at a temperature of 120°C. and a flow rate of about 2 ml. condensed steam/min. Following steam elution, a second loading cycle is begun. The resin has the following properties: surface area of about 37 sq. meters/gram; pore size range of about 400 to about 1200 Angstrom units; pore volume or porosity of about 0.66 cc/gram or 0.47 cc/cc; cation exchange capacity of about 6.3 meq/gram — all properties measured in the dry $H^+$ form.

| | Experimental Results (per gram dry resin) | | | | |
|---|---|---|---|---|---|
| | $SO_2$ Capacity (mmols) to Leakage of | | Total $SO_2$ Capacity | Final $SO_2$ Leakage | $SO_2$ Steam Eluted |
| Cycle | 50 ppm | 500 ppm | (mmol) | (ppm) | (mmol) |
| 1 | .22 | .93 | 1.04 | 700 | .40 |
| 2 | .042 | .42 | .54 | 640 | .31 |

EXAMPLE 2

A 4.9659 g (12 cc) sample of solvent treated and dried resin G is placed in a 10 mm I.D. stainless steel column. The resin is a macroreticular styrene — 80% DVB resin (surface area = 425 m²/g) with 1.62 mmoles of iminodiacetic acid/g dry in the sodium form. A gas containing 2000 ppm $SO_2$ and 10% $H_2O$ in $N_2$ was preheated to 140°C. and passed, downflow, through the column at 2000 ml./min. The column is heated to 70°C. Prior to exposure to $SO_2$, the initially dry resin is equilibrated with the moist gas, typically attaining 80 – 95% solids. The leakage of $SO_2$ from the column is iodometrically determined. After the leakage exceeds 500 ppm, the $SO_2$ flow is discontinued and the column is heated to 140°C. while dry nitrogen preheated to 140°C. is passed down the column. The thermal removal of $SO_2$ is followed by iodometric titration for 40 minutes.

The following table shows the results of three successive cycles comprising equilibration, adsorption and thermal elution.

| Experimental Results (per gram dry resin) | | | |
|---|---|---|---|
| | Cycle 1 | 2 | 3 |
| $SO_2$ Capacity at 500 ppm Leakage (m moles) | 0.68 | 0.47 | 0.47 |
| Total $SO_2$ Capacity (m moles) | 0.79 | 0.65 | 0.58 |
| (final leakage, ppm) | (1614) | (1469) | (1791) |
| Total $SO_2$ Eluted (m moles) | 0.68 | 0.67 | 0.67 |

After cycling, the surface area of resin G is found to have declined to 364 $m^2/g$ but the porosity is unchanged.

EXAMPLE 3

An 8.923 g (22 cc) sample of solvent swelled ion exchange resin A is placed in a 16 mm I.D. stainless steel column. Resin A is a macroreticular styrene — 3.5% DVB — 4% trimethylolpropane trimethacrylate resin with a surface area of 35 $m^2/g$ with 2.68 m moles of iminodiacetic acid/g dry in the sodium form. A simulated stack gas containing 2037 ppm $SO_2$, 3.8% $O_2$ and 11% $H_2O$ in nitrogen is passed, downflow, through the column at 3000 ml./min. at 60°C. Prior to exposure to $SO_2$, the initially dry resin is equilibrated with moist gas attaining approximately 89% solids. The $SO_2$ loading and elution is carried out in a manner identical to that in example 1.

Table II shows the capacity at 500 ppm leakage maintained over 12 cycles. The cation exchange capacity of the resin was unchanged by cycling. During cycling the surface area dropped from 35 $m^2/g$ to 19 $m^2/g$ while the porosity changed from 0.465 to 0.382 cc/cc. It is known that most of this collapse in structure occurs on the first cycle.

Table II

| $SO_2$ Capacities of Resin A (per gram dry resin) | |
|---|---|
| Cycle | Capacity (m moles) |
| 1 | 1.20 |
| 2 | 0.58 |
| 3 | 0.48 |
| 4 | 0.52 |
| 5 | 0.70 |
| 6 | 0.52 |
| 7 | 0.46 |
| 8 | 0.47 |
| 9 | 0.42 |
| 10 | 0.44 |
| 11 | 0.35 |
| 12 | 0.35 |

EXAMPLE 4

Example 2 is repeated with a 10.9003 g (23 cc) sample of Resin I in the sodium form, with the following results.

| Resin I | |
|---|---|
| Cation Exchange Capacity (CEC) | 3.91 meq/gm |
| Surface Area | 43 $m^2/g$ |
| Porosity | 0.440 cc/cc |
| $SO_2$Capacity: | |
| To 500 ppm Leakage | 0.95 mmoles/gm dry |
| To Final Leakage | 1.20 mmoles/gm dry at 970 ppm |
| Total $SO_2$ Thermally Eluted | 54% |

EXAMPLE 5

Example 3 is repeated with 9.5262 g (23 cc) of Resin N in the sodium form with the following results:

| Resin N | |
|---|---|
| CEC | 4.45 meq/gm |
| Surface Area | 5 $m^2/g$ |
| Porosity | 0.511 cc/cc |
| $SO_2$Capacity: | |
| To 500 ppm Leakage | 0.48 mmoles/gm dry |
| To Final Leakage | 0.62 mmoles/gm dry at 1926 ppm |
| Total $SO_2$ Eluted | 86% |

EXAMPLE 6

Example 3 is repeated with 12.1690 g (30 cc) of Resin H in the sodium form, with the following results

| Resin H | |
|---|---|
| CEC | 9.65 meq/gm |
| Surface Area | 27 $m^2/g$ |
| Porosity | 0.530 cc/cc |
| $SO_2$ capacity: | |
| TO 500 ppm | 1.11 mmoles/gm dry |
| To Final Leakage | 1.18 mmoles/gm dry at 1908 ppm |
| Total $SO_2$ eluted | 59% |

The following examples show various syntheses of resins useful in the process of the invention.

EXAMPLE 7

Preparation of Resin I, an N-methyl-N-benzyl glycine resin

The resin is prepared in two steps from a styrene, divinylbenzene (6%) ethylvinylbenzene (5%) terpolymer (polymerized in the usual fashion, phase extended with 40% methylisobutylcarbinol). The first step is synthesis of a methylbenzylamine resin utilizing the aminomethylation procedure. This resin is then reacted with sodium chloroacetate in the presence of aqueous caustic to give the desired amino acid.

Methylbenzylamine Resin

| Charges | |
|---|---|
| Terpolymer | 52 g(dry) |
| N-methyl-N-methylolformamide (NMNMF) | 90 g |
| 1-Nitropropane | 160 g |
| 99% Sulfuric Acid | 114 g |
| 20% Oleum | 180 g |

Procedures

The resin and 1-nitropropane are changed to a 500 ml flask and heated to 80°. The NMNMF is added, the mixture held at 85° – 90° for one hour, then cooled to 55° – 60°C. The sulfuric acid is charged to a 1 liter flask and the resin slurry is slowly charged to the acid with the temperature maintained below 30°C. in the 1 liter flask. When half of the slurry has been charged, the mixture begins to separate and the oleum addition is initiated at such a rate that its addition is complete 30 minutes after completion of the resin addition. The reaction mixture is stirred at 25° for 16 hours and then quenched with 45 ml. of tap water. An additional 50 ml. of tap water is charged and the nitropropane is removed by azeotropic distillation giving 237 grams of product as sulfate salt (35.0% solids). The free base has a total anion exchange capacity of 5.37 meq/g dry.

N-Methyl-N-benzylglycine Resin I

Charges:
| | |
|---|---|
| Methylbenzylamine Resin | 68.0 g (43.3% solids) |
| Sodium Chloroacetate | 29.1 g |
| 50% Sodium Hydroxide | 16.0 g |
| Water | 116.0 g |

Procedure

The resin, 36 ml. water and caustic are placed in a 500 ml. flask (condenser, stirrer, thermometer) and stirred at room temperature for 15 minutes. The sodium chloroacetate in 80 g of water is then added to the reaction mixture, the mixture is heated to reflux at 100°C. and held overnight. The product is batch washed with five 250 ml. portions of DI water giving 116 g of material having 32% solids (95% yield). The cation exchange capacity is 3.91 meq/g dry resin.

EXAMPLE 8

Preparation of Resin G

Briefly, a copolymer is aminomethylated, then reacted with sodium chloroacetate giving an iminodiacetic acid resin.

Benzyl Amine Resin

Charges:
| | |
|---|---|
| Styrene Divinylbenzene copolymer (80%) DVB | 198.3 g (dry) |
| 1-nitropropane | 562.5 g |
| Ethylene Dichloride | 157.5 g |
| Glacial Acetic Acid | 56.3 g |
| Aminomethylating Reagent | 200 g |
| 99% Sulfuric Acid | 594 g |
| 20% Oleum | 560.3 g |

Procedure

The procedure is essentially similar to the preparation of methylbenzyl amine resin. The yield is 572.4 g (46.2% solids) in the sulfate form. Elemental analysis shows 3.41% nitrogen, 76.43% carbon and 7.42% hydrogen.

Iminodiacetic Acid Resin G

Charges:
| | |
|---|---|
| Benzyl Amine Resin (free base form) | 174.4 g (43% solids) |
| 50% Sodium Hydroxide | 29.3 g |
| Sodium Chloroacetate | 85.3 g in 400 ml. water |

Procedure

The resin in the free base form is charged to a 1 liter flask and drained free of water. To the aqueous solution of sodium chloroacetate the sodium hydroxide is added and the mixture heated to reflux and held so for three hours. The crude product is washed twice with deionized (DI) water, transferred to a column and treated with 0.5 N HCl until acid leakage was observed. For example, after rinsing resin G with DI water until neutral, the product weighs 180 g (solids 49.4%) and has a cation exchange capacity of 3.20 meq/g dry resin. This resin is converted to the disodium salt by passing 4% NaOH (1000 ml./30 ml. resin) through, followed by four bed volumes of DI water.

Iminodiacetic acid resins such as Resins A, G, O and P may also be prepared according to methods disclosed in U.S. Pat. No. 2,980,607 and Chemical and Engineering News, Volume 32, page 1896 (1954). Resin A is available from the Rohm and Haas Company under the commercial designation of Amberlite XE-318.

EXAMPLE 9

Synthesis of an Iminodiphosphonic Acid Resin H

This resin was prepared in one step from benzylamine resin such as described in the preparation of Resin G. The polymer for Resin H is a terpolymer of styrene, divinylbenzene (4%) and ethylvinylbenzene (3.5%), phase extended with 44.9% methylisobutylcarbinol. The benzylamine resin in the free base form contains 9.0% nitrogen.

Charges:
| | |
|---|---|
| Benzylamine Resin (in the bisulfate form) | 590 g (wet) |
| Orthophosphorous Acid | 180 g in 100 ml. |
| Concentrated HCl | 300 ml. |
| 37% Aqueous Formaldehyde | 320 ml. |

Procedure

The resin, orthophosphorus acid solution and concentrated HCl are placed in a 3-liter flask (stirrer, addition funnel and reflux condenser) and the mixture heated to reflux (95°C.). The formaldehyde is added over 30 minutes, the addition funnel replaced by a thermometer and the refluxing slurry stirred overnight (temperature 104° after formaldehyde addition). The batch is cooled to 25°, filtered and washed twice with water after which the column is washed with two liters of DI water (pH of effluent neutral). The moist product weights 608.5 g (45% solids) and has a cation exchange capacity of 9.65 meq/g dry resin. The resin is converted to its sodium salt by treatment with an excess of 4% sodium hydroxide followed by four bed volumes of DI water. The incorporation of sodium was 12.1%.

EXAMPLE 10

Synthesis of a Picolinic Acid Resin N

This resin is prepared from a 4-vinylpyridine, 7% divinylbenzene ethylvinylbenzene (6%) terpolymer (phase extender — 35% diisobutylketone) in three steps as outlined below. The first step is oxidation of the pyridine to its N-oxide with $H_2O_2$. This N-oxide is then reacted with sodium cyanide to give a 2-cyanopyridine resin which is hydrolyzed with hydrochloric acid giving the desired picolinic acid.

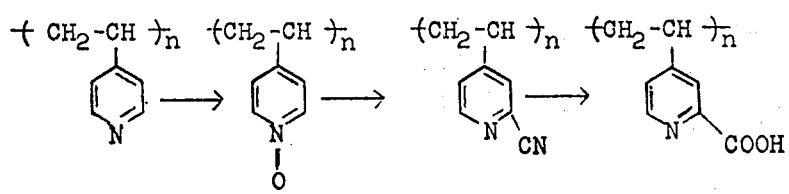

Pyridine N-oxide Resin

Charges:
| | |
|---|---|
| Pyridine Resin | 420 g (dry) |
| Glacial Acetic Acid | 3000 g |
| 30% Aqueous Hydrogen Peroxide | 904 g |

Procedure

The resin and acetic acid are stirred for 15 minutes at room temperature in a 5-liter flask (stirrer, thermometer, reflux condenser). The peroxide is added and the mixture heated slowly to 70°C. and held at that temperature overnight. The mixture is cooled to 30°C. washed with water until effluent is neutral, then treated with 10% NaOH, more water until pH of effluent is seven and finally with four portions of methanol. After drying overnight, the resin weighs 483 g (N = 9.3%, O = 16.37%).

2-Cyanopyridine Resin

Charges:
| | |
|---|---|
| Pyridine N-oxide Resin | 480 g (dry) |
| Methanol | 2500 ml. |
| Dimethyl sulfate | 630 g |
| Sodium Cyanide | 588 g in 2000 ml. tap water |

Procedure

The resin and methanol are charged to a five liter flask (stirrer, condenser, thermometer) and stirred for 15 minutes. The dimethyl sulfate is added, the reaction mixture stirred until the exotherm had subsided, and then heated at 50°C overnight. After cooling the reaction the mixture is washed with methanol then four times with water. The drained resin is then added to the freshly prepared sodium cyanide solution, the temperature of the mixture being kept below 50°C. The slurry is stirred overnight then washed with D.I. water until neutral. A sample of the dried product contains 15.06% nitrogen.

Picolinic Acid Resin N

Charges:
| | |
|---|---|
| Reaction product from previous reaction in concentrated hydrochloric acid | 2500 ml. |

Procedure

The 2-cyanopyridine resin and acid are recharged to a 5-liter flask (stirrer, thermometer, condenser) and stirred for 15 minutes. The mixture is heated at reflux overnight. The cooled product is washed with water (column) until the effluent pH was neutral giving 1507 grams of material (solids of 35.7%) having 8.93% nitrogen, 17.62% oxygen and a cation exchange capacity of 4.45 meq/g dry.

Vinylbenzylchloride/Amino Diacetic Acid Resin

Resin O is analogous to Resin A with the exception that the backbone comprises vinylbenzylchloride and 8% divinylbenzene. Resin P is prepared in a similar fashion as Resins O and A, but in this Resin the copolymer composition comprises 43% vinylbenzylchloride, 8% divinylbenzene, and the remainder styrene.

Table I

| Resin | Copolymer Composition | Functionality | Surface Area (m²/g) | Porosity (cc/cc) | CEC (meq/g dry) | SO₂Capacity to 500 ppm (meq/g dry) | Percent Eluted |
|---|---|---|---|---|---|---|---|
| A | 3.5% DVB 4% TMPTMA styrene | iminodiacetic acid | 37 | 0.498 | 6.30 | 1.24(cycle 1) 0.47 (9) | 52 78 |
| B | 20% DVB/styrene 33% MIBC | iminodiacetic acid | 69 | 0.328 | 3.91 | 0.64 - (1) 0.22 - (2) | 32 96 |
| C | 25% DVB/styrene 70% { 1 - toluene { 1 - MIBC | iminodiacetic acid | 315 | 0.540 | 2.89 | 0.73 - (1) 0.44 - (2) 0.33 - (7) | 64 93 95 |
| D | 50% DVB/styrene 33% MIBC | iminodiacetic acid | 200 | 0.401 | 1.17 | 0.28 - (1) 0.20 - (2) | 81 100+ |
| E | 50% DVB/styrene 40% MIBC | iminodiacetic acid | 259 | 0.468 | 1.25 | 0.32 - (1) 0.20 - (8) | 60 87 |
| F | 80% DVB 70% Toluene | iminodiacetic acid | 733 | 0.442 | 1.10 | 0.24 - (1) 0.24 - (2) | 91 99 |
| G | 80% DVB 70% toluene | iminodiacetic acid | 425 | 0.507 | 3.23 | 0.68 - (1) 0.47 - (2) 0.49 - (3) | 86 103 118 |
| H | 4% DVB/styrene 44.9% MIBC | iminodiphosphonic | 27.0 | 0.527 | 9.65 | 1.10-(cycle 1) 0.57 (3) | 59 60 |
| I | 6% DVB/styrene 40% MICB | N-methyl-N-benzyl glycine | 43.2 | 0.436 | 3.91 | 0.95-(cycle 1) 0.13-(2) | 54 73 |
| J | 80% DVB 70% toluene | iminodipropionic acid | | | 3.47 | 0.56-(cycle 1) 0.30-(2) | 37 42 |
| K | 8% DVB/acrolein/ 2% diethylene glycol divinylether 35% toluene | α-alkylglycine | | | 4.26 | 1.15 0.29 | 27 77 |
| L | Acrolein/8% DVB/ 2% diethylene glycol divinylether (water phase extended) | N-methyl-α-alkyl-glycine | | | 3.95 | 0.28 -(1) 0.13 -(2) | 52 59 |
| M | 6% DVB/styrene 43% MIBK | 2-phenyl glycine | | | 1.97 | 0.88 | 57 |
| N | 7% DVB/ | picolinic | 5.0 | 0.511 | 4.45 | 0.48 | 81 |

Table I-continued

| Resin | Copolymer Composition | Functionality | Surface Area (m²/g) | Porosity (cc/cc) | CEC (meq/g dry) | $SO_2$ Capacity to 500 ppm (meq/g dry) | Percent Eluted |
|---|---|---|---|---|---|---|---|
| O | vinylpiridine VBC/8% DVB | acid iminodiacetic acid | | | 6.71 | 1.14 (1) 0.55 (2) | 56 87 |
| P | 43% VBC/8% DVB/ styrene | iminodiacetic acid | | | 3.39 | 1.09 (1) 0.31 (2) | 40 76 |

The above resins are all phase extended with a variety of solvent systems such as toluene, methylisobutyl carbinol, methylisobutyl ketone, butyl ether and even water. All the above resins are in the sodium form. However, other metal salt forms such as potassium or lithium may also be useful.

We claim:

1. A process for separating sulfur oxides from gaseous mixtures containing them which comprises contacting said gases with a crosslinked macroreticular resin comprising a functional moiety containing at least one basic nitrogen and at least one acid metal salt group thereby absorbing a substantial part of the sulfur oxide from the gaseous streams or mixtures.

2. A process as claimed in claim 1 wherein the sulfur oxide is sulfur dioxide and is adsorbed from a gaseous stream at a temperature of up to about 120°C.

3. A process as claimed in claim 1 wherein the gaseous stream is pre-treated with a water scrubber.

4. A process as claimed in claim 3 wherein the sulfur oxide is adsorbed from a gaseous stream at a temperature in the range of about 50° – 100°C.

5. A process as claimed in claim 1 wherein the gaseous mixture is pre-treated with an electrostatic precipitator.

6. A process as claimed in claim 1 wherein the resins are utilized at a percent moisture level of from about 2 to 20.

7. A process as claimed in claim 1 which process is a fluid bed system.

8. A process as claimed in claim 1 wherein the resin is an iminodiacetic acid resin.

9. A process as claimed in claim 8 wherein the resin is in the sodium salt form.

10. A process as claimed in claim 1 wherein the resins are thermally regenerable.

11. A process as claimed in claim 10 wherein the resins are regenerable by steam.

12. A process as claimed in claim 1 wherein the resin is a picolinic acid resin.

13. A process as claimed in claim 12 wherein the resin is in the sodium salt form.

14. A process as claimed in claim 1 wherein the resin is N-methyl-N-benzylglycine.

15. A process as claimed in claim 1 wherein the macroreticular resin has a backbone derived from vinylbenzylchloride.

16. A process as claimed in claim 14 wherein the resin is in the sodium salt form.

17. A process as claimed in claim 1 wherein the gaseous mixtures are emitted from a utility generating plant.

18. A process as claimed in claim 1 wherein the gaseous mixtures are emitted from an industrial plant using boilers to generate energy.

* * * * *